United States Patent
Guan et al.

[19]

[11] Patent Number: 6,165,299
[45] Date of Patent: Dec. 26, 2000

[54] METHOD FOR MAKING DIGITAL VERSATILE DISCS

[76] Inventors: Jia Ji (George) Guan, 689 Hamann Dr., San Jose, Calif. 95117; Roland P. Zaiss, Hammer Str. 6, D 71638 Ludwigsburg, Germany

[21] Appl. No.: 09/281,641

[22] Filed: Mar. 30, 1999

Related U.S. Application Data

[60] Provisional application No. 60/098,011, Aug. 26, 1998.

[51] Int. Cl.$^7$ .............................. B32B 31/12; B32B 31/28
[52] U.S. Cl. .................... 156/74; 156/275.5; 156/275.7; 156/295; 156/314; 156/315
[58] Field of Search .................................. 156/74, 275.5, 156/275.7, 295, 310, 314, 315; 369/283, 286; 428/65.2

[56] References Cited

U.S. PATENT DOCUMENTS 5,575,882  11/1996  Holz et al. ............................... 156/314
5,982,740  11/1999  Schwartz ................................. 369/286

FOREIGN PATENT DOCUMENTS 0 844 608 A2  5/1998  European Pat. Off. .
WO 97/31372  8/1997  WIPO .

OTHER PUBLICATIONS

Patent Abstracts of Japan, Publication No. 01248335, Oct. 3, 1989.

*Primary Examiner*—Michael W. Ball
*Assistant Examiner*—Michael A Tolin
*Attorney, Agent, or Firm*—Martine Penilla & Kim, LLP

[57] ABSTRACT

A method for making a digital versatile disc (DVD) includes providing top and bottom substrates, each of the top and bottom substrates being disc-shaped and having a pitted surface. A reflective layer is formed over the pitted surface of the top substrate and a semireflective layer is formed over the pitted surface of the bottom substrate. A wetting promoter is applied over the reflective layer of the top substrate and, if desired, over the semireflective layer of the bottom substrate. The top and bottom substrates are bonded together with an adhesive material using a simple drop technique to form a DVD. The wetting promoter enhances wetting of the adhesive material on the bonded surfaces of the substrates.

55 Claims, 11 Drawing Sheets

METHOD FOR MAKING DIGITAL VERSATILE DISCS

CROSS REFERENCE TO RELATED APPLICATIONS

This application claims priority from U.S. Provisional Patent Application No. 60/098,011, filed Aug. 26, 1998, and entitled "Method for Making Digital Versatile Discs." The disclosure of this provisional application is incorporated herein by reference.

BACKGROUND OF THE INVENTION

The present invention relates generally to digital versatile discs and, more particularly, to a method for making digital versatile discs.

The latest generation of optical disc technology is the digital versatile disc (DVD), which is sometimes referred to as a digital video disc. A DVD has significantly more data capacity than a compact disc (CD). For example, the data capacity of DVD 5 is about 4.7 GB, which corresponds to the data capacity of about seven CDs. The data capacity of DVD 9 is about 8.5 GB, which corresponds to the data capacity of about thirteen CDs.

In the manufacturing of current DVDs, two 0.6 mm polycarbonate substrates are bonded together with an adhesive material. A number of techniques for bonding the substrates are currently in use. In each of these bonding techniques, coating of the substrates with an adhesive material may be achieved by capillary force.

One technique for bonding the substrates together is sometimes referred to as the drop technique. In this technique a bead of an adhesive material is first dispensed on a first substrate having a reflective layer formed thereover. A second substrate is then freely dropped on the first substrate from a height of about one-quarter of an inch. Finally, the first and second substrates are spun to spread the adhesive material therebetween to form an adhesive layer.

The drop technique is desirable because of its simplicity, but suffers from three key drawbacks that have heretofore restricted its use to DVD 5 fabrication. The first drawback is that air may be forced into or otherwise trapped in the adhesive material when the second substrate is dropped on the first substrate. This is problematic because air trapped in the adhesive material may cause air voids to be formed in the adhesive layer if the adhesive material does not fully wet the surfaces of the first and second substrates. The second drawback is that a thin adhesive layer, e.g., an adhesive layer having a thickness of about 40 $\mu$m to about 70 $\mu$m in accordance with DVD 9 specifications, cannot be formed within a short cycle time, e.g., about 4 seconds. The third drawback is that it is hard to control the uniformity of the adhesive layer. In spite of these drawbacks, the drop technique is suitable for use in DVD 5 process flows because the thickness and uniformity of the adhesive layer is not crucial in a DVD 5. The reason that the adhesive layer is not crucial in a DVD 5 is that all the recorded data is on the first substrate having the reflective layer formed thereover, and, consequently, the laser beam does not have to pass through the adhesive layer to read the recorded data. In contrast, in a DVD 9, which has recorded data on the second substrate that must be read by the laser beam after it has passed through the adhesive layer, the thickness and uniformity of the adhesive layer are crucial.

Another technique for bonding the substrates together is sometimes referred to as the gap fill technique. In this technique the first and second substrates are first brought close together so as to define a narrow gap therebetween. The outer edges of the substrates are then pulled apart by the application of force, e.g., with suction cups, and a hypodermic needle is inserted between the substrates. Once the hypodermic needle is in the proper position, a controlled amount of adhesive material is dispensed therefrom. After the hypodermic needle is withdrawn and the outer edges of the substrates are released, the first and second substrates are spun to spread the adhesive material therebetween to form an adhesive layer.

Attempts have been made to use the gap fill technique in DVD 9 process flows because it can form the requisite thin adhesive layer within a short cycle time, e.g., about 4 seconds. Problems have been experienced in these attempts, however, because the adhesive layer formed using the gap fill technique lacks uniformity. A further drawback of gap fill technique is that it is significantly more difficult to implement than the drop technique because it requires complex mechanical equipment, which is not only difficult to design, but also difficult to clean and maintain under manufacturing conditions.

In view of the foregoing, there is a need for a simple and reliable method of forming a relatively thin, uniform adhesive layer in a DVD that consistently achieves thorough wetting of the substrates with adhesive material.

SUMMARY OF THE INVENTION

Broadly speaking, the present invention fills this need by providing a wetting promoter that enables thorough wetting of the adhesive material to be achieved on the top and bottom substrates of a digital versatile disc (DVD). The wetting promoter increases the surface energy of one or both of the substrates.

In one embodiment of the present invention, a method for making a DVD is provided. In this method top and bottom substrates are first provided. Each of the top and bottom substrates is disc-shaped and has a pitted surface that represents recorded data. Next, a reflective layer of, e.g., aluminum, is formed over the pitted surface of the top substrate and a semireflective layer of, e.g., gold, silicon, or a silicon derivative, is formed over the pitted surface of the bottom substrate. A wetting promoter is then applied over the reflective layer of the top substrate. Thereafter, the top and bottom substrates are bonded together with an adhesive material to form a DVD, with the wetting promoter enhancing the wetting of the adhesive material on bonded surfaces of the top and bottom substrates.

The top and bottom substrates are preferably bonded together by first dispensing a bead of the adhesive material over the reflective layer of the top substrate. The bottom substrate is then aligned over the top substrate such that the semireflective layer of the bottom substrate faces the reflective layer of the top substrate. Once aligned, the bottom substrate is dropped on the top substrate. Thereafter, the top and bottom substrates are subjected to a spinning operation to spread the adhesive material to form an adhesive layer therebetween. If the adhesive material is an ultraviolet-curing adhesive, e.g., a free radical ultraviolet-curing adhesive, then the bonding operation further includes exposing the top and bottom substrates to ultraviolet light to cure the adhesive. The adhesive layer formed by the spinning operation preferably has a thickness in the range from about 40 $\mu$m to about 70 $\mu$m.

In one preferred embodiment, the wetting promoter contains at least material selected from the group consisting of a solvent, an acrylate-based adhesive, and an acrylate monomer/oligomer. The solvent is preferably selected from the group consisting of methyl alcohol, ethyl alcohol, propyl alcohol, isopropyl alcohol, ethyl acetate, and mixtures thereof. In one preferred formulation, the wetting promoter contains about 30% by weight of methyl alcohol and about 70% by weight of isopropyl alcohol. In another preferred formulation, the wetting promoter contains about 70% by weight to about 95% by weight of an alcohol component and about 5% to about 30% of ethyl acetate. One preferred wetting promoter having this formulation contains about 85% by weight of isopropyl alcohol and about 15% by weight of ethyl acetate.

If desired, the wetting promoter may be applied over the reflective layer of the top substrate and the semireflective layer of the bottom substrate. When the top and bottom substrates are bonded together with an adhesive material to form a DVD, the wetting promoter enhances the wetting of the adhesive material on the bonded surfaces of the top and bottom substrates. Alternatively, the wetting promoter may be applied over just the semireflective layer of the bottom substrate. Generally speaking, however, better wetting of the reflective layer with adhesive material may be achieved by applying the wetting promoter directly on the reflective layer.

The present invention provides a wetting promoter that enables a thin, uniform, and air bubble-free adhesive layer to be formed within a relatively short cycle time using a drop technique. Thus, the method of the present invention advantageously simplifies the DVD 9 fabrication process by obviating the need to use complex mechanical equipment to form the adhesive layer.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

The present preferred embodiments of the invention will now be described in detail with reference to the accompanying drawings.

Figure 1:
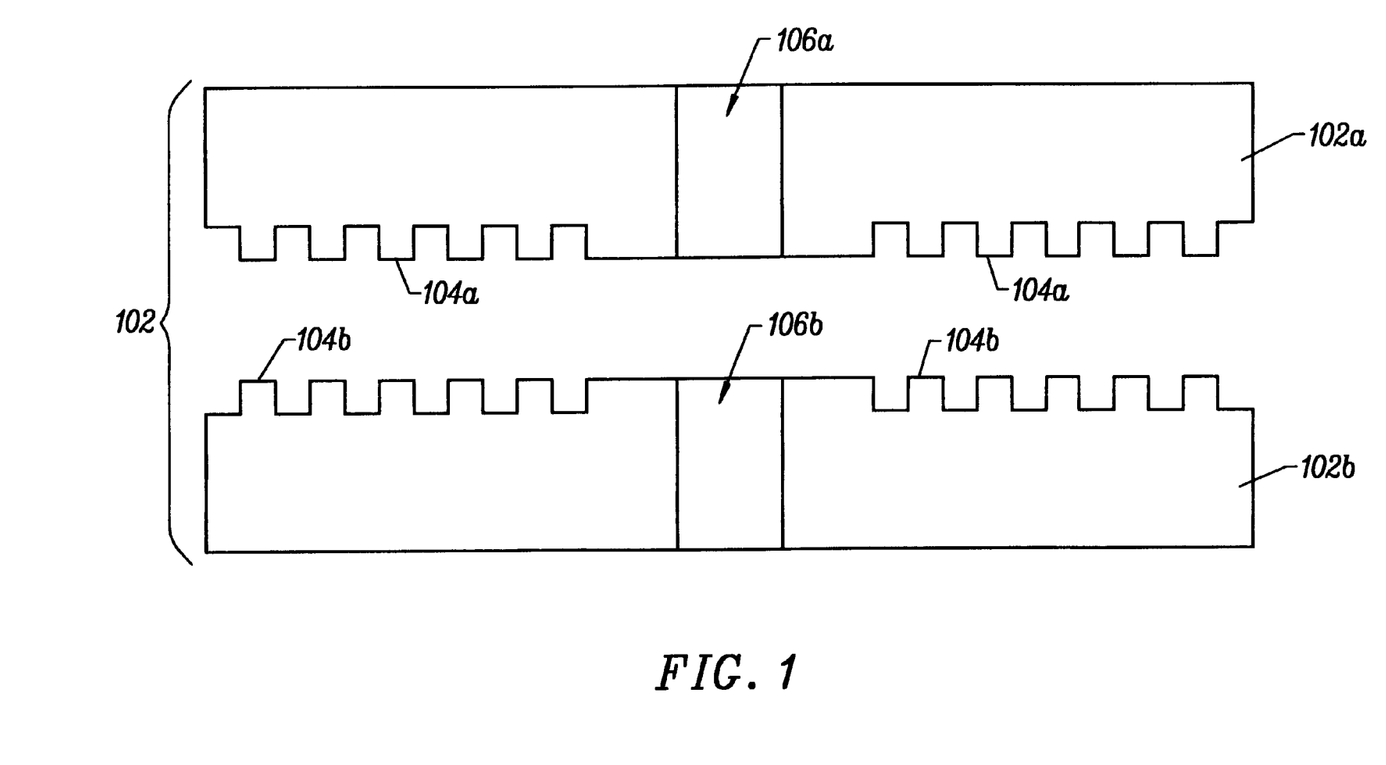
FIG. 1 is a cross-sectional view of a digital versatile disc (DVD) showing the top and bottom substrates in a spaced apart relationship before being bonded together.

FIG. 1 is a cross-sectional view of digital versatile disc (DVD) 102 showing top substrate 102a and bottom substrate 102b in a spaced apart relationship before the substrates have been bonded together. As used in connection with the description of the invention, the terms "top substrate" and "bottom substrate" refer to the relative position of the substrates when the DVD is operated in a standard player in which the laser beam emanates from below the lowermost substrate. Substrates 102a and 102b, which are disc-shaped, may be formed from any suitable plastic material, e.g., polycarbonate, and preferably have a thickness of about 0.6 mm. Top substrate 102a and bottom substrate 102b are provided with pitted surfaces 104a and 104b, respectively. As is well known to those skilled in the art, the data pits in the pitted surfaces are read by a laser beam as either a digital "1" or "0." It will be apparent to those skilled in the art that the data pits shown in pitted surfaces 104a and 104b have been simplified for purposes of illustrating the invention and are not intended to depict actual recorded data. Top substrate 102a and bottom substrate 102b are further provided with center holes 104a and 104b, respectively.

The molding process used to form the substrates is preferably designed to avoid the formation of a burr that sticks out from the pitted side of the substrate. The presence of such a burr on the substrate may interfere with the centering and alignment of the substrates during the bonding process. A suitable process for forming a burr-free substrate is disclosed in U.S. Provisional Patent Application No. 60/126,994, filed on the same day as the present application, and entitled "Method for Making a Substrate for a Digital Versatile Disc," the disclosure of which is incorporated herein by reference.

Figure 2:
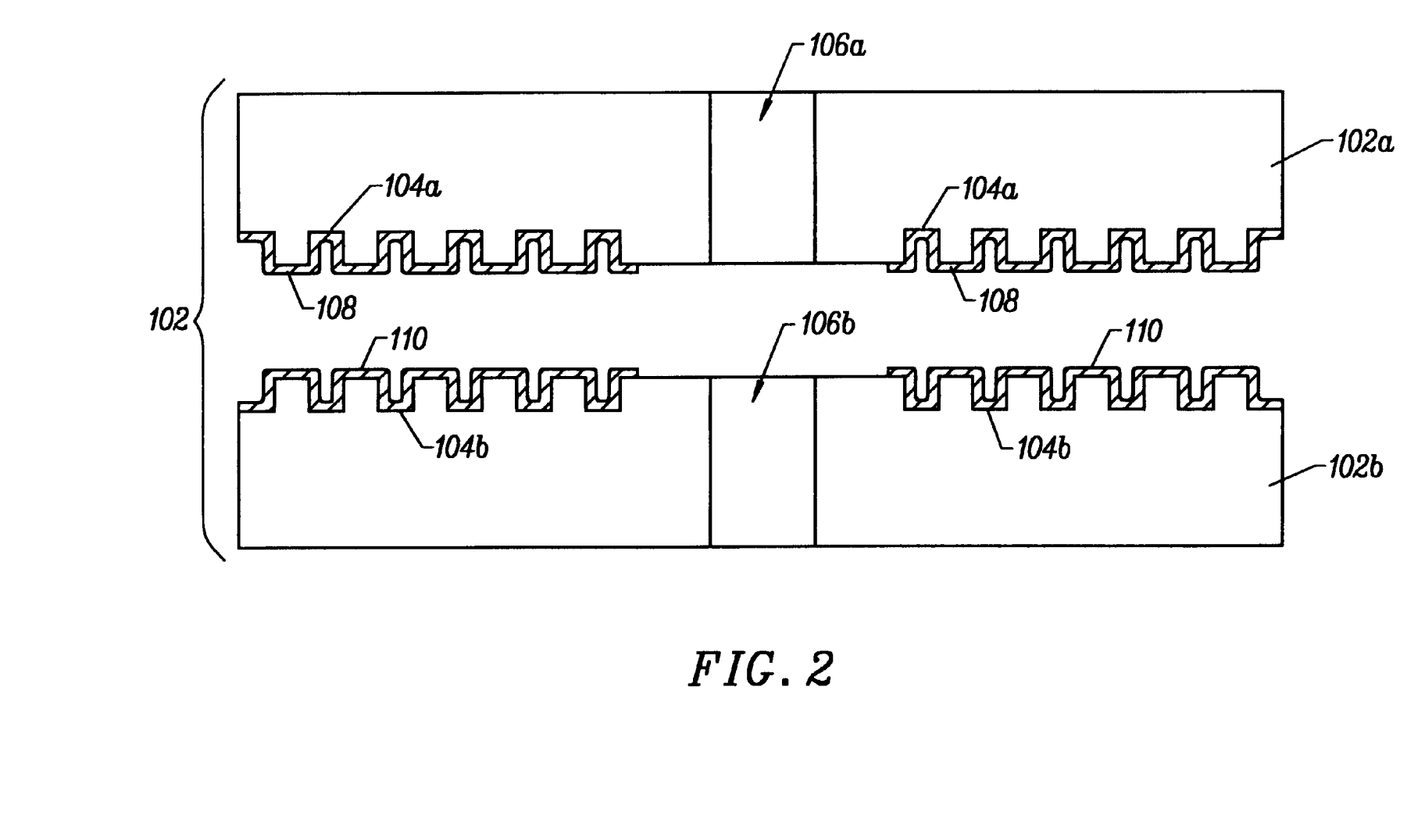
FIG. 2 shows a cross-sectional view of the structure shown in FIG. 1 after a reflective layer has been formed on the top substrate and a semireflective layer has been formed on the bottom substrate.

FIG. 2 is a cross-sectional view of the structure shown in FIG. 1 after reflective and semireflective layers have been formed over top substrate 102a and bottom substrate 102b, respectively. As shown in FIG. 2, reflective layer 108 is formed over top substrate 102a. Reflective layer 108 may be formed of any suitable highly reflective material, e.g., aluminum. Semireflective layer 110 is formed over bottom substrate 102b. Semireflective layer 110 may be formed of any suitable material having a reflectance of about 18% to about 30%, e.g., gold, silicon, and silicon derivatives. Reflective layer 108 and semireflective layer 110 may be formed by known deposition techniques, e.g., sputtering.

When DVD 102 is operated in a player, the laser beam, which emanates below bottom substrate 102b, first reads the data pits in pitted surface 104b of bottom substrate 102b. Once the laser beam reaches the end of the data pits in pitted surface 104b, the laser beam quickly refocuses onto and reads the data pits in pitted surface 104a of top substrate 102a. As the laser beam must pass through layer 110 to reach pitted surface 104a of top substrate 102a, layer 110 must be capable of transmitting a substantial portion of the laser beam. Accordingly, as mentioned above, layer 110 is preferably formed of a semireflective material such as, for example, gold, silicon, or a silicon derivative, so that a substantial portion of the laser beam can be transmitted therethrough.

Figure 3:
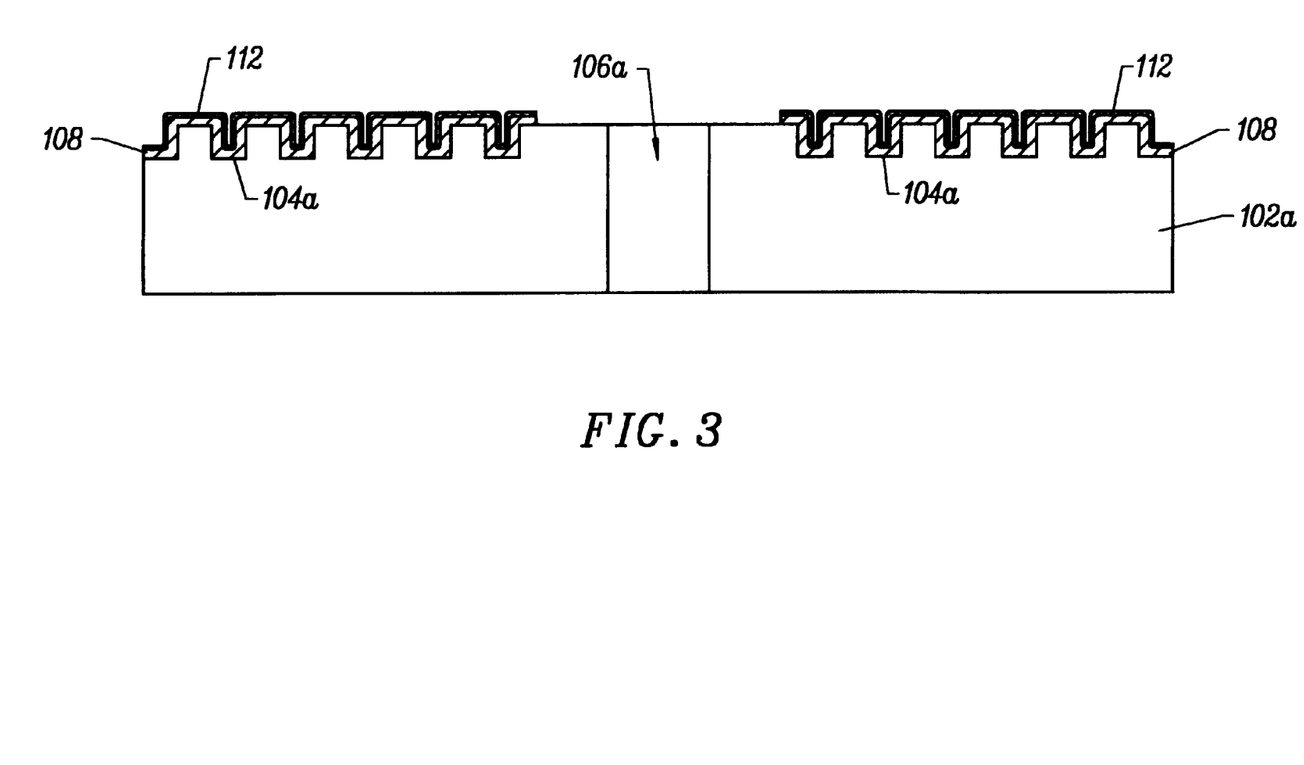
FIG. 3 shows a cross-sectional view of the top substrate shown in FIG. 2 in which the top substrate has been flipped over and coated with a wetting promoter.

FIG. 3 is a cross-sectional view of top substrate 102a as shown in FIG. 2 in which substrate 102a has been flipped over and, in accordance with the invention, coated with a wetting promoter. As shown in FIG. 3, a coating of wetting promoter 112 is disposed over reflective layer 108. As used in connection with the description of the invention, the term "wetting promoter" means any substance that increases the surface energy of a substrate and thereby promotes wetting of the substrate with the adhesive material. For optimal performance, the molecules of the wetting promoter should have different chemical groups at each end. One end group should be chemically similar to the adhesive material and the other end group should be chemically similar to the reflective layer, e.g., aluminum, the semireflective layer, e.g., gold, silicon, or a silicon derivative, and the substrate material, e.g., polycarbonate. Those skilled in the art will appreciate, however, that the wetting promoter must not react significantly with these materials, e.g., aluminum, gold, silicon, silicon derivatives, and polycarbonate. In addition, the refractive index of the wetting promoter should be close to that of the plastic material used to form the substrates, e.g., polycarbonate. Another requirement of the wetting promoter is that it should be nontoxic.

More particularly, the wetting promoter should be formulated to increase the surface energy of the reflective layer, e.g., aluminum, the semireflective layer, e.g., gold, silicon, or a silicon derivative, and the substrate material, e.g., polycarbonate, to obtain thorough wetting of these materials with the adhesive material. The benefits of thorough wetting include minimizing the usage of adhesive material, avoiding air bubbles, and increasing the ease with which the uniformity and thickness of the adhesive layer can be controlled. Thorough wetting also enlarges the window of acceptable parameters for spin processing. Another requirement of the wetting promoter is that it must be capable of being cured within the same short curing period for the adhesive material. This curing period is typically about 2 to 4 seconds under an ultraviolet lamp. Any material that cannot be cured within this short time period will become a barrier that reduces the bonding strength between the disc substrates and the adhesive material.

In one embodiment, the wetting promoter contains at least one material selected from the group consisting of a solvent, an acrylate-based adhesive, and an acrylate monomer/oligomer. By way of example, suitable solvents include methyl alcohol, ethyl alcohol, propyl alcohol, isopropyl alcohol, ethyl acetate, and mixtures thereof Those skilled in the art will appreciate that other low boiling point and low flash point alcohols also may be used.

Several preferred formulations for the wetting promoter are set forth in the following discussion. In accordance with a first preferred formulation, the wetting promoter is one of methyl alcohol ($CH_3OH$), isopropyl alcohol (($CH_3$)$_2CH_2O$), and a mixture of methyl alcohol and isopropyl alcohol. One preferred mixture contains about 30% by weight of methyl alcohol and about 70% by weight of isopropyl alcohol. Methyl alcohol has a lower reaction rate toward polycarbonate and isopropyl alcohol is a very safe solvent. Consequently, this mixture provides not only the characteristics of volatility, non-corrosiveness, and good cleaning capacity, but also a safety benefit. Whether used alone or in a mixture, methyl alcohol and isopropyl alcohol function as a wetting promoter by cleaning the surface of the disc substrate and thereby increasing the surface energy of the substrate. Curing is not an issue with this formulation because no additional material is deposited on the disc surface.

In accordance with a second preferred formulation, the wetting promoter contains about 70% by weight to about 95% by weight of an alcohol component and about 5% by weight to about 30% by weight of ethyl acetate ($CH_3COOC_2H_5$). The alcohol component is preferably one of methyl alcohol, isopropyl alcohol, and a mixture of methyl alcohol and isopropyl alcohol. One preferred formulation contains about 85% by weight of isopropyl alcohol and about 15% by weight of ethyl acetate. Ethyl acetate is a strong solvent for oil stains and, as discussed above, the selected alcohol has a low corrosion rate toward polycarbonate. Thus, this formulation provides good cleaning without significantly damaging the polycarbonate. This formulation functions as a wetting promoter by cleaning the surface of the disc substrate and thereby increasing the surface energy of the substrate.

In accordance with a third preferred formulation, the wetting promoter contains an acrylate-based adhesive. One example of a suitable acrylate-based adhesive is Desolite 650-002, which is commercially available from DSM Desotech Inc. of Elgin, Illinois. Those skilled in the art will appreciate that other commercially available acrylate-based adhesives also may be used. If desired, the acrylate-based adhesive may be diluted with one of the solvents described above.

In accordance with a fourth preferred formulation, the wetting promoter contains an acrylate monomer/oligomer. To avoid curing issues, the acrylate monomer/oligomer preferably belongs to the same family of adhesive materials as the adhesive material being used to bond the substrates. Suitable acrylate monomers/oligomers typically may be obtained from the manufacturer of the adhesive material being used to bond the substrates. In this manner, the acrylate monomer/oligomer, which has a high potential and therefore provides for better wetting, may be cured along with the adhesive material within the required curing period, e.g., about 2 to 4 seconds. Consequently, the acrylate monomer/oligomer does not adversely affect the final bonding strength. If desired, the acrylate-based adhesive may be diluted with one of the solvents described above.

The wetting promoter may be applied in accordance with known techniques. For example, the wetting promoter may be applied by first dispensing the wetting promoter with a dispenser in an open bowl, and then spinning off the dispensed wetting promoter to leave either a dry or wet coating or film, depending on the type of wetting promoter used.

Figure 4:
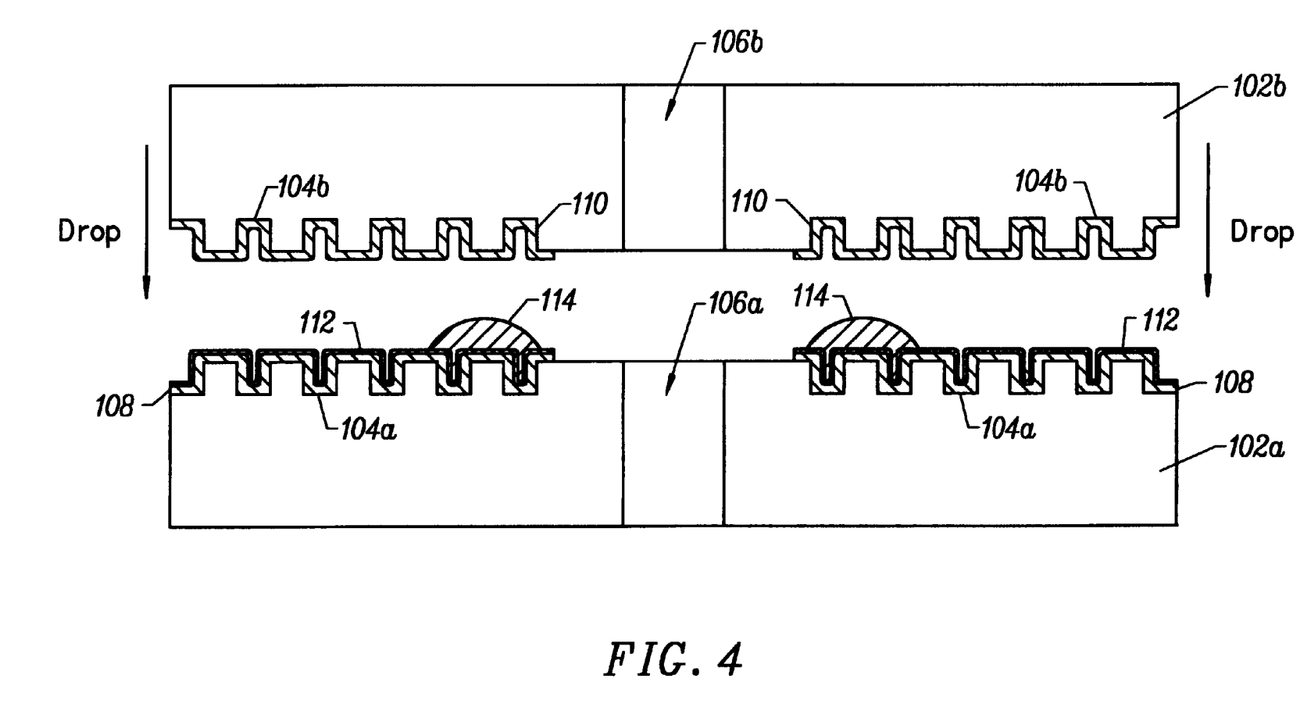
FIG. 4 is a cross-sectional view illustrating the drop technique used to bond the top and bottom substrates together to form a DVD in accordance with one embodiment of the invention.

FIG. 4 illustrates the drop technique used to bond the top and bottom substrates together to form a DVD in accordance with one embodiment of the invention. As shown in FIG. 4, bottom substrate 102b is aligned over top substrate 102a such that semireflective layer 110 of bottom substrate 102b faces reflective layer 108 of top substrate 102a. Before bottom substrate 102b is aligned over top substrate 102a, adhesive material 114 is applied over reflective layer 108 of top substrate 102a. Once adhesive material 114 has been applied and bottom substrate 102b has been aligned over top substrate 102a, bottom substrate 102b is freely dropped on top substrate 102a, preferably from a height of about one-quarter of an inch, as indicated by the arrows in FIG. 4. After bottom substrate 102b is dropped on top substrate 102a, substrates 102a and 102b are subjected to a spinning operation to form an adhesive layer therebetween, as will be described in detail below.

Adhesive material 114 may be any adhesive material suitable for use in DVD bonding. In the fabrication of a DVD 9 as shown herein, a free radical ultraviolet-curing adhesive such as, for example, Desolite 650-002, which is commercially available from DSM Desotech Inc. of Elgin, Illinois, may be used. Those skilled in the art will appreciate that in the fabrication of other types of DVDs, e.g., DVD 5 and DVD 10, different types of adhesives, e.g., hot-melt adhesives and cationic ultraviolet-curing adhesives, may be used. Adhesive material 114 may be applied over reflective layer 108 of top substrate 102a with a dispenser in an open bowl. Once bottom substrate 102b has been dropped on top substrate 102a, substrates 102a and 102b are subjected to a spinning operation to form an adhesive layer therebetween. To maximize throughput, the cycle time of the spinning operation is preferably about 4 seconds. During the first 2 seconds, substrates 102a and 102b are subjected to relatively slow spinning at, e.g., about 100 rpm to about 400 rpm. During the last 2 seconds, substrates 102a and 102b are subjected to relatively fast spinning at, e.g., about 800 rpm to about 2,000 rpm. During the spinning operation, the increased surface energy of top substrate 102a provided by wetting promoter 112 helps to achieve thorough wetting of reflective layer 108 with adhesive material 114. After the spinning operation, substrates 102a and 102b are exposed to ultraviolet light to cure adhesive material 114 and thereby bond substrates 102a and 102b together.

Figure 5:
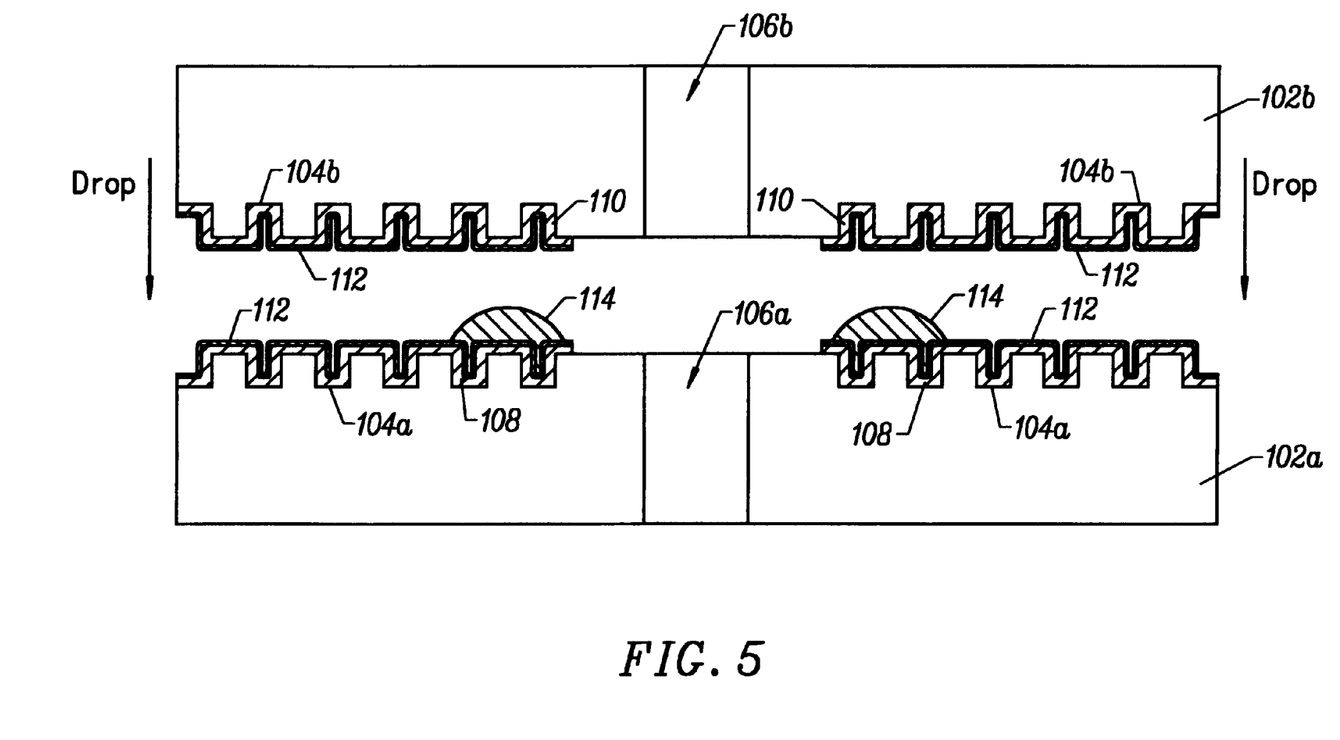
FIG. 5 is a cross-sectional view illustrating the drop technique used to bond the top and bottom substrates together to form a DVD in accordance with another embodiment of the invention.

FIG. 5 illustrates the drop technique used to bond the top and bottom substrates together to form a DVD in accordance with another embodiment of the invention. The structure shown in FIG. 5 is the same as that shown in FIG. 4 except that the coating of wetting promoter 112 is provided over both reflective layer 108 of top substrate 102a and also semireflective layer 110 of bottom substrate 102b. The coating of wetting promoter 112 may be applied over semireflective layer 110 of bottom substrate 102b in the same manner in which such coating is applied over reflective layer 108 of top substrate 102a and then spun off. Furthermore, in this embodiment the aligning, dropping, spinning, and exposing operations may be the same as described above in connection with the description of FIG. 4. During the spinning operation, wetting promoter 112 increases not only the surface energy of top substrate 102a, but also the surface energy of bottom substrate 102b. As a result, wetting promoter 112 enables thorough wetting of reflective layer 108 and semireflective layer 110 with adhesive material 114 to be achieved.

Figure 6:
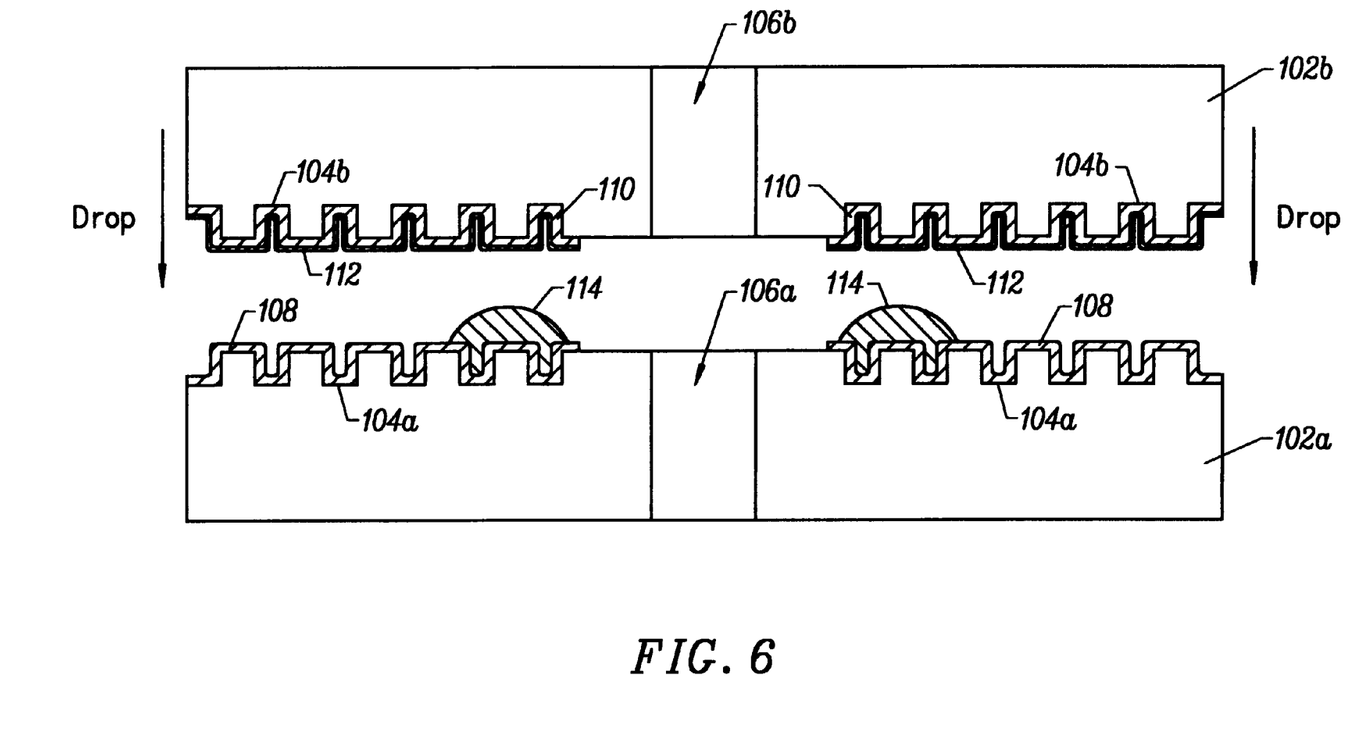
FIG. 6 is a cross-sectional view illustrating the drop technique used to bound the top and bottom substrates together to form a DVD in accordance with yet another embodiment of the invention.

FIG. 6 illustrates the drop technique used to bond the top and bottom substrates together to form a DVD in accordance with yet another embodiment of the invention. The structure shown in FIG. 6 is the same as that shown in FIG. 4 except that the coating of wetting promoter 112 is provided over semireflective layer 110 of bottom substrate 102b instead of reflective layer 108 of top substrate 102a. The coating of wetting promoter 112 may be applied over semireflective layer 110 of bottom substrate 102b in the same manner in which such coating is applied over reflective layer 108 of top substrate 102a. Furthermore, in this embodiment the aligning, dropping, spinning, and exposing operations may be the same as described above in connection with the description of FIG. 4. During the spinning operation, wetting promoter 112 increases the surface energy of bottom substrate 102b and thereby helps to achieve better wetting of reflective layer 108 with adhesive material 114. Generally speaking, better wetting of the reflective layer with adhesive material may be achieved by applying the wetting promoter directly on the reflective layer. In certain situations, however, adequate wetting of the reflective layer with adhesive material may be achieved by applying the wetting promoter directly on the semireflective layer in accordance with this embodiment.

Figure 7:
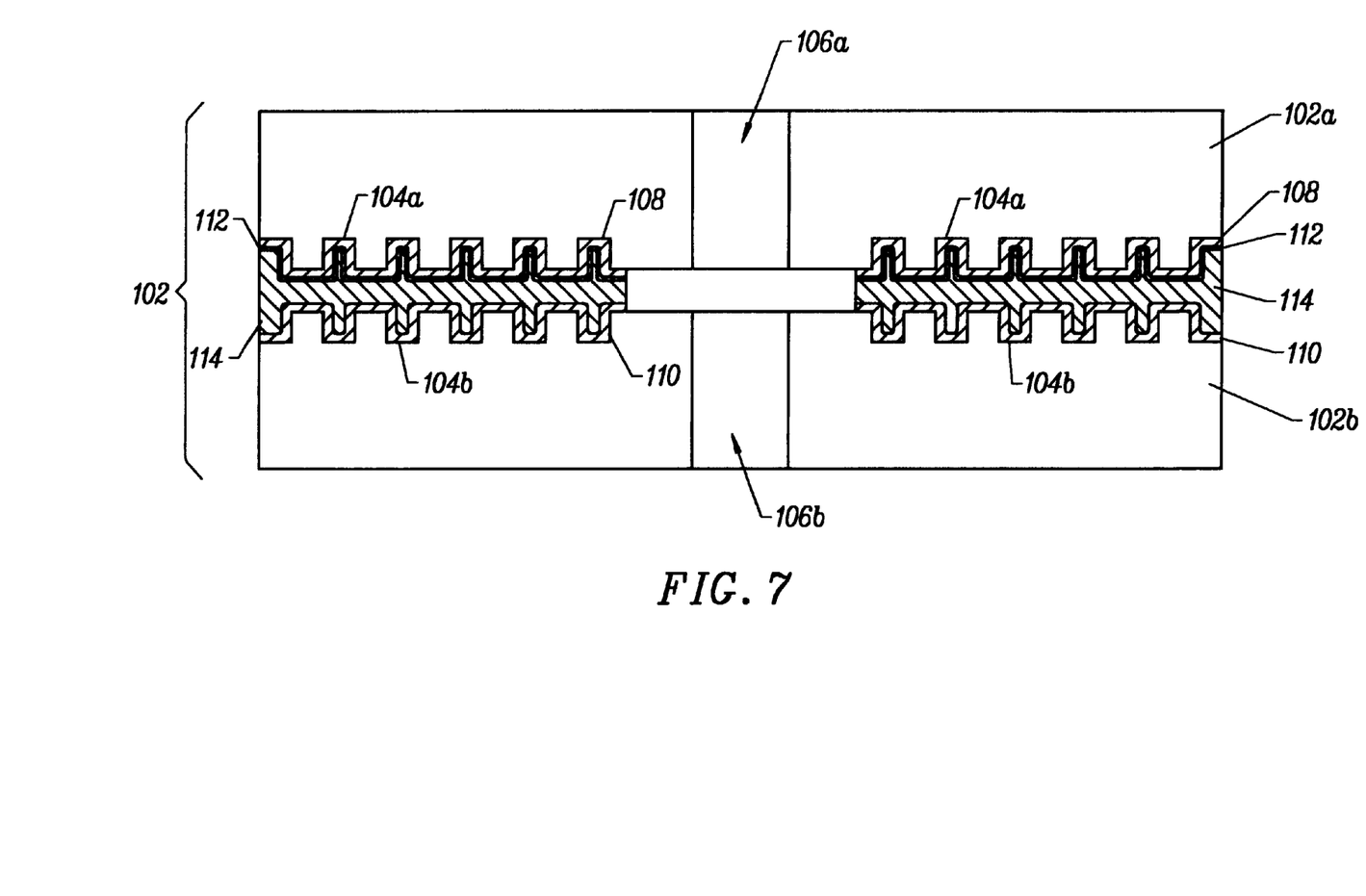
FIG. 7 shows a cross-sectional view of a DVD formed by the drop technique illustrated in FIG. 4.
Figure 8:
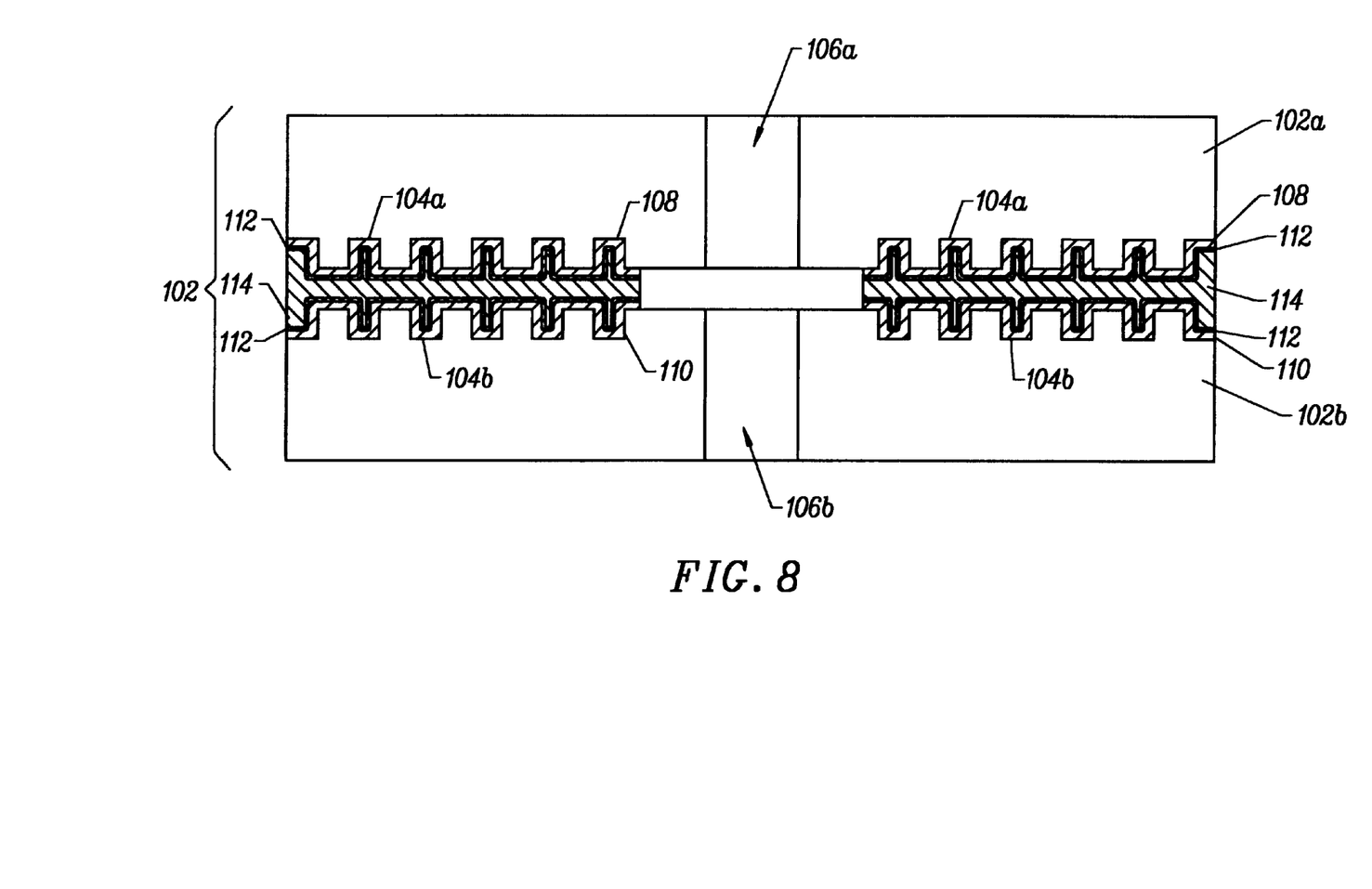
FIG. 8 shows a cross-sectional view of a DVD formed by the drop technique illustrated in FIG. 5.
Figure 9:
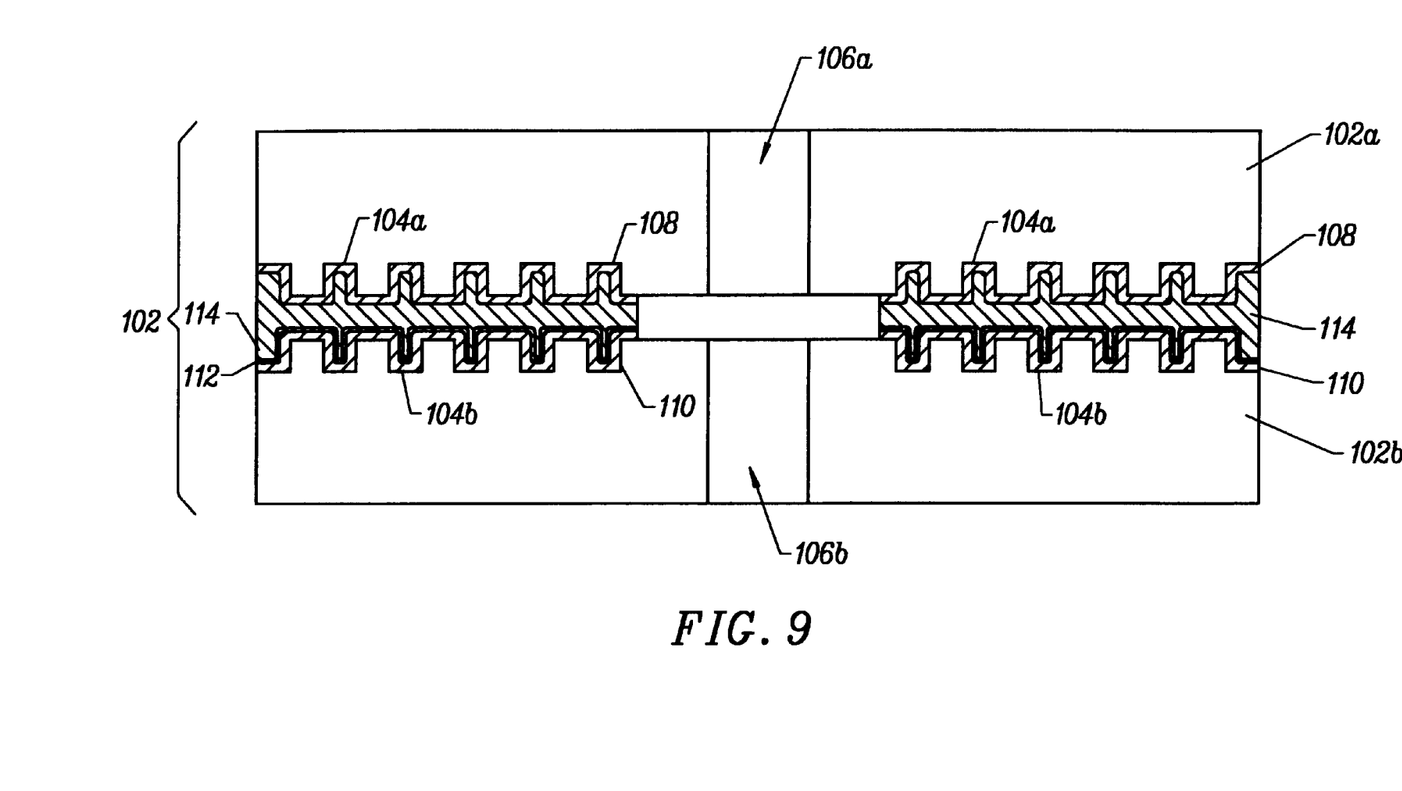
FIG. 9 shows a cross-sectional view of a DVD formed by the drop technique illustrated in FIG. 6.

FIGS. 7–9 are cross-sectional views of a DVD formed by the drop techniques illustrated in FIGS. 4–6, respectively. The relative position of the substrates in the DVDs shown in FIGS. 7–9 has been reversed relative to that shown in FIGS. 4–6. In other words, the relative position of the substrates in the DVDs shown in FIGS. 7–9 corresponds to the relative position of the substrates when a DVD is operated in the standard player described above. As shown in FIGS. 7–9, adhesive layer 114 bonds top substrate 102a and bottom substrate 102b together to form DVD 102. To comply with DVD 9 specifications, the thickness and uniformity of the adhesive layer must be 55 $\mu$m±15 $\mu$m. In other words, the thickness of the adhesive layer must be maintained between 40 $\mu$m and 70 $\mu$m. Moreover, the variation in the thickness of the adhesive layer must not exceed about±10 $\mu$m within one disc or about±4 $\mu$m within one revolution. Prior attempts to form an adhesive layer that complies with DVD 9 specifications using a drop technique have not been successful because the adhesive layer formed thereby lacks the requisite uniformity and cannot be formed within a relatively short cycle time, e.g., about 4 seconds. Consequently, conventional DVD 9 process flows typically use either the gap fill bonding technique. As discussed above, this technique is undesirable not only because it requires complex mechanical equipment, but also because it produces an adhesive layer that lacks uniformity. It has been unexpectedly discovered that the application of a wetting promoter in accordance with the invention enables a drop technique to be used to form a thin, uniform adhesive layer that complies with DVD 9 specifications within a relatively short cycle time. Thus, the method of the present invention advantageously simplifies the DVD 9 fabrication process by obviating the need to use complex mechanical equipment to form the adhesive layer.

Figure 10:
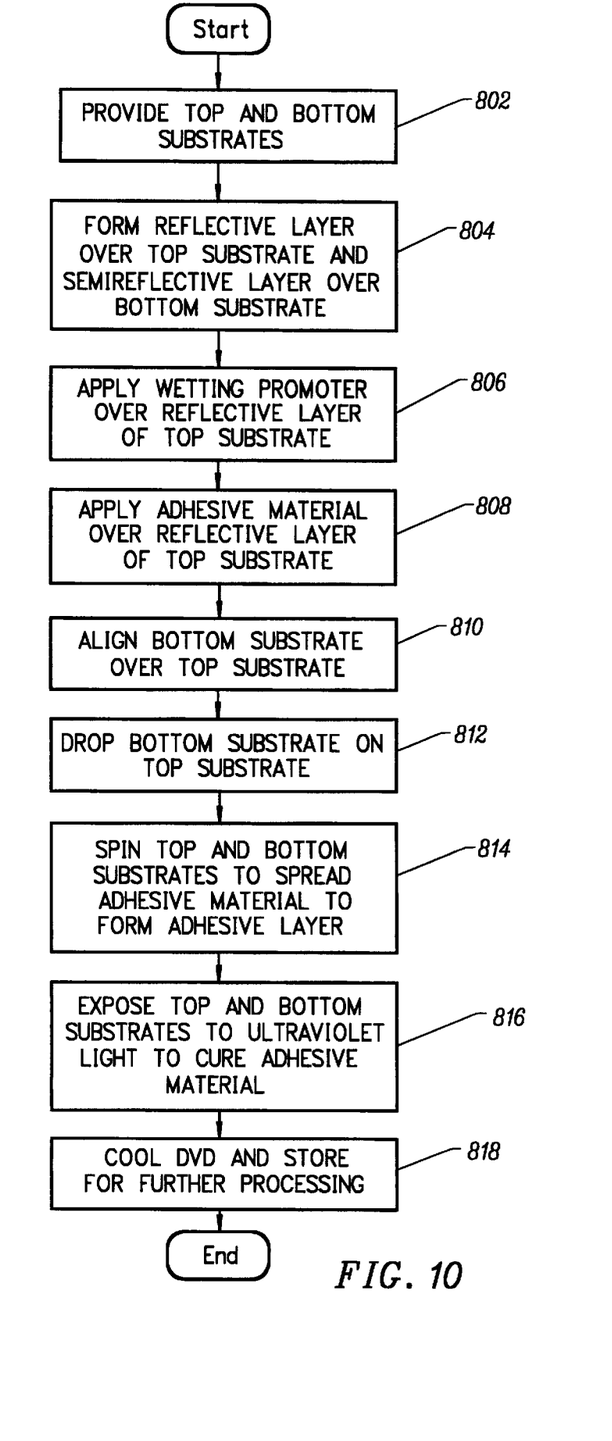
FIG. 10 is a flow chart showing the process flow for the fabrication of a DVD in accordance with one embodiment of the present invention.

FIG. 10 is a flow chart showing the process flow for the fabrication of a DVD in accordance with one embodiment of the present invention. The process flow starts with operation 802 in which the top and bottom substrates are provided. In DVD 9 fabrication each of the substrates has a pitted surface representing recorded data. In operation 804 a reflective layer is formed over the top substrate and a semireflective layer is formed over the bottom substrate. The reflective layer is preferably aluminum and the semireflective layer is preferably gold, silicon, or a silicon derivative. In operation 806 a wetting promoter is applied over the reflective layer of the top substrate. Once the wetting promoter is applied, the substrate is subjected to a spinning operation at a speed between about 1,000 rpm and about 5,000 rpm. Next, in operation 808, an adhesive material is applied over the reflective layer of the top substrate. In DVD 9 fabrication the adhesive material is preferably a free radical ultraviolet-curing adhesive. During application of the wetting promoter and the adhesive material, the temperature of the substrates is preferably maintained between about 22° C. and about 29° C. Once the adhesive material is applied, in operation 810 the bottom substrate is aligned over the top substrate such that the semireflective layer of the bottom substrate faces the reflective layer of the top substrate. The process flow continues with operation 812 in which the bottom substrate is freely dropped on the top substrate, preferably from a height of about one-quarter of an inch. After the bottom substrate has been dropped, in operation 814 the substrates are subjected to spinning to spread the adhesive material to form an adhesive layer. During spinning, the wetting promoter increases the surface energy of the top substrate and thereby enables thorough wetting of the adhesive material to be achieved on the reflective layer. The spinning operation preferably includes a slow spinning stage at about 100 rpm to about 400 rpm followed by a fast spinning stage at about 800 rpm to about 2,000 rpm. Next, in operation 816, the top and bottom substrates are exposed to ultraviolet light to cure the adhesive material. After curing, the process flow concludes with operation 818 in which the thus-formed DVD is cooled, inspected, and stored for further processing, e.g., printing or labeling.

Figure 11:
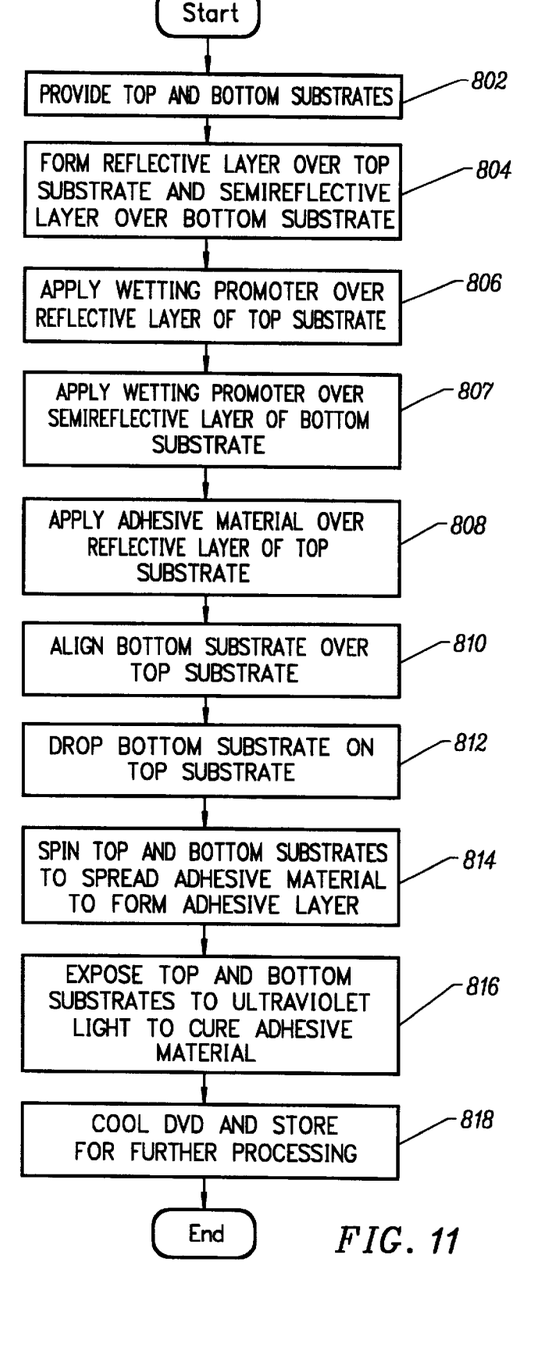
FIG. 11 is a flow chart showing the process flow for the fabrication of a DVD in accordance with another embodiment of the present invention.

FIG. 11 is a flow chart showing the process flow for the fabrication of a DVD in accordance with another embodiment of the present invention. The process flow starts with operations 802, 804, and 806 as described above in connection with FIG. 10. Once the wetting promoter has been applied over the reflective layer of the top substrate in operation 806, the process flow continues with operation 807 in which the wetting promoter is applied over the semireflective layer of the bottom substrate. Once the wetting promoter is applied, the bottom substrate is subjecting to a spinning operation as described above with respect to the top substrate. Thus, in this embodiment the wetting promoter is applied over both the reflective layer of the top substrate and the semireflective layer of the bottom substrate. Following operation 807, the process flow proceeds with operations 808, 810, 812, 814, 816, and 818 as described above in connection with FIG. 10. During spinning in operation 814, the wetting promoter increases not only the surface energy of the top substrate, but also the surface energy of the bottom substrate. As a result, the wetting promoter enables thorough wetting of the adhesive material to be achieved on the reflective layer and the semireflective layer.

It will be apparent to those skilled in the art that the method of the present invention may be implemented as either an in-line process or a stand-alone process. For example, to implement the method as an in-line process the wetting promoter may be applied in an open bowl that is part of an in-line process unit. To implement the method as a stand-alone process, the wetting promoter may be applied in an open bowl that is part of a separate, stand-alone workstation. Furthermore, although the invention has been described herein as being particularly useful in DVD 9 fabrication, those skilled in the art will appreciate that the invention also may be used in the fabrication of other types of DVDs, e.g., DVD 5, DVD 10, and DVD 18.

In summary, the present invention provides a wetting promoter that enables a thin, uniform, and air bubble-free adhesive layer to be formed between the top and bottom substrates of a DVD within a relatively short cycle time using a simple drop technique. The invention has been described herein in terms of several preferred embodiments. Other embodiments of the invention will be apparent to those skilled in the art from consideration of the specification and practice of the invention. For example, the formulation of the wetting promoter may be varied from that described herein. The embodiments and preferred features described above should be considered exemplary, with the invention being defined by the appended claims and equivalents thereof.

What is claimed is:

1. A method for making a digital versatile disc (DVD), comprising:
    providing a first disc-shaped substrate having a pitted surface and a reflective layer formed over said pitted surface;
    providing a second disc-shaped substrate having a pitted surface and a semireflective layer formed over said pitted surface;
    applying a wetting promoter over at least one of said reflective layer of said first substrate and said semireflective layer of said second substrate; and
    bonding said top and bottom substrates together with an adhesive material to form a DVD, wherein said wetting promoter enhances wetting of said adhesive material on bonded surfaces of said first and second substrates.

2. The method of claim 1, wherein the wetting promoter contains a solvent selected from the group consisting of methyl alcohol, ethyl alcohol, propyl alcohol, isopropyl alcohol, ethyl acetate, and mixtures thereof.

3. The method of claim 1, wherein the wetting promoter contains about 30% by weight of methyl alcohol and about 70% by weight of isopropyl alcohol.

4. The method of claim 1, wherein the wetting promoter contains about 70% by weight to about 95% by weight of an alcohol component and about 5% by weight to about 30% by weight of ethyl acetate.

5. The method of claim 4, wherein the alcohol component is selected from the group consisting of methyl alcohol, ethyl alcohol, propyl alcohol, isopropyl alcohol, and mixtures thereof.

6. The method of claim 1, wherein the wetting promoter contains about 85% by weight of isopropyl alcohol and about 15% by weight of ethyl acetate.

7. The method of claim 1, wherein the wetting promoter contains an acrylate-based adhesive.

8. The method of claim 1, wherein the wetting promoter contains an acrylate monomer/oligomer.

9. The method of claim 1, wherein the bonding of the first and second substrates comprises:
    dispensing a bead of the adhesive material over the reflective layer of the first substrate;
    aligning the second substrate over the first substrate such that the semireflective layer of the second substrate faces the reflective layer of the first substrate;
    dropping the second substrate on the first substrate; and
    spinning the first and second substrates to spread the adhesive material to form an adhesive layer therebetween.

10. The method of claim 9, wherein the adhesive material is an ultraviolet-curing adhesive, and the bonding of the first and second substrates further comprises:
    exposing the first and second substrates to ultraviolet light to cure said ultraviolet-curing adhesive.

11. The method of claim 1, wherein the adhesive layer has a thickness in a range from about 40 $\mu$m to about 70 $\mu$m.

12. The method of claim 10, wherein the adhesive layer has a thickness in a range from about 40 $\mu$m to about 70 $\mu$m.

13. The method of claim 1, wherein the reflective layer is comprised of aluminum.

14. The method of claim 13, wherein the semireflective layer is comprised of a material selected from the group consisting of gold, silicon, and silicon derivatives.

15. A method for making a digital versatile disc (DVD), comprising:
    providing top and bottom substrates, each of said top and bottom substrates being disc-shaped and having a pitted surface;

forming a reflective layer over said pitted surface of said top substrate;

forming a semireflective layer over said pitted surface of said bottom substrate;

applying a wetting promoter over said reflective layer of said top substrate; and bonding said top and bottom substrates together with an adhesive material to form a DVD, wherein said wetting promoter enhances wetting of said adhesive material on bonded surfaces of said top and bottom substrates.

16. The method of claim 15, wherein the wetting promoter contains a solvent selected from the group consisting of methyl alcohol, ethyl alcohol, propyl alcohol, isopropyl alcohol, ethyl acetate, and mixtures thereof.

17. The method of claim 15, wherein the wetting promoter contains about 30% by weight of methyl alcohol and about 70% by weight of isopropyl alcohol.

18. The method of claim 15, wherein the wetting promoter contains about 70% by weight to about 95% by weight of an alcohol component and about 5% by weight to about 30% by weight of ethyl acetate.

19. The method of claim 18, wherein the alcohol component is selected from the group consisting of methyl alcohol, ethyl alcohol, propyl alcohol, isopropyl alcohol, and mixtures thereof.

20. The method of claim 15, wherein the wetting promoter contains about 85% by weight of isopropyl alcohol and about 15% by weight of ethyl acetate.

21. The method of claim 15, wherein the wetting promoter contains an acrylate-based adhesive.

22. The method of claim 15, wherein the wetting promoter contains an acrylate monomer/oligomer.

23. The method of claim 15, wherein the bonding of the top and bottom substrates comprises:

dispensing a bead of the adhesive material over the reflective layer of the top substrate;

aligning the bottom substrate over the top substrate such that the semireflective layer of the bottom substrate faces the reflective layer of the top substrate;

dropping the bottom substrate on the top substrate; and spinning the top and bottom substrates to spread the adhesive material to form an adhesive layer therebetween.

24. The method of claim 23, wherein the adhesive material is an ultraviolet-curing adhesive, and the bonding of the top and bottom substrates further comprises:

exposing the top and bottom substrates to ultraviolet light to cure said ultraviolet-curing adhesive.

25. The method of claim 15, wherein the adhesive layer has a thickness in a range from about 40 $\mu$m to about 70 $\mu$m.

26. The method of claim 24, wherein the adhesive layer has a thickness in a range from about 40 $\mu$m to about 70 $\mu$m.

27. The method of claim 15, wherein the reflective layer is comprised of aluminum.

28. The method of claim 27, wherein the semireflective layer is comprised of a material selected from the group consisting of gold, silicon, and silicon derivatives.

29. A method for making a digital versatile disc (DVD), comprising:

providing top and bottom substrates, each of said top and bottom substrates being disc-shaped and having a pitted surface;

forming a reflective layer over said pitted surface of said top substrate;

forming a semireflective layer over said pitted surface of said bottom substrate;

applying a wetting promoter over said reflective layer of said top substrate;

applying an adhesive material over said reflective layer of said top substrate;

aligning said bottom substrate over said top substrate such that said semireflective layer of said bottom substrate faces said reflective layer of said top substrate;

dropping said bottom substrate on said top substrate; and spinning said top and bottom substrates to spread said adhesive material to form an adhesive layer between said top and bottom substrates that bonds said substrates together to form a DVD, wherein said wetting promoter enhances wetting of said adhesive material on bonded surfaces of said top and bottom substrates.

30. The method of claim 29, wherein the adhesive material is an ultraviolet-curing adhesive, and, after spinning, the method further comprises:

exposing the top and bottom substrates to ultraviolet light to cure said ultraviolet-curing adhesive.

31. The method of claim 29, wherein the wetting promoter contains a solvent selected from the group consisting of methyl alcohol, ethyl alcohol, propyl alcohol, isopropyl alcohol, ethyl acetate, and mixtures thereof.

32. The method of claim 29, wherein the wetting promoter contains about 30% by weight of methyl alcohol and about 70% by weight of isopropyl alcohol.

33. The method of claim 29, wherein the wetting promoter contains about 70% by weight to about 95% by weight of an alcohol component and about 5% by weight to about 30% by weight of ethyl acetate.

34. The method of claim 33, wherein the alcohol component is selected from the group consisting of methyl alcohol, ethyl alcohol, propyl alcohol, isopropyl alcohol, and mixtures thereof.

35. The method of claim 29, wherein the wetting promoter contains about 85% by weight of isopropyl alcohol and about 15% by weight of ethyl acetate.

36. The method of claim 29, wherein the wetting promoter contains an acrylate-based adhesive.

37. The method of claim 29, wherein the wetting promoter contains an acrylate monomer/oligomer.

38. The method of claim 29, wherein the adhesive layer has a thickness in a range from about 40 $\mu$m to about 70 $\mu$m.

39. The method of claim 30, wherein the adhesive layer has a thickness in a range from about 40 $\mu$m to about 70 $\mu$m.

40. The method of claim 29, wherein the reflective layer is comprised of aluminum.

41. The method of claim 40, wherein the semireflective layer is comprised of a material selected from the group consisting of gold, silicon, and silicon derivatives.

42. A method for making a digital versatile disc (DVD), comprising:

providing top and bottom substrates, each of said top and bottom substrates being disc-shaped and having a pitted surface;

forming a reflective layer over said pitted surface of said top substrate;

forming a semireflective layer over said pitted surface of said bottom substrate;

applying a wetting promoter over said reflective layer of said top substrate;

applying a wetting promoter over said semireflective layer of said bottom substrate; and bonding said top and bottom substrates together with an adhesive material to form a DVD, wherein said wetting promoter enhances wetting of said adhesive material on bonded surfaces of said top and bottom substrates.

43. The method of claim 42, wherein the bonding of the top and bottom substrates comprises:

dispensing a bead of the adhesive material over the reflective layer of the bottom substrate;

aligning the bottom substrate over the top substrate such that the semireflective layer of the bottom substrate faces the reflective layer of the top substrate;

dropping the bottom substrate on the top substrate; and spinning the top and bottom substrates to spread the adhesive material to form an adhesive layer therebetween.

44. The method of claim 43, wherein the adhesive material is an ultraviolet-curing adhesive, and the bonding of the top and bottom substrates further comprises:

exposing the top and bottom substrates to ultraviolet light to cure said ultraviolet-curing adhesive.

45. The method of claim 42, wherein the wetting promoter contains a solvent selected from the group consisting of methyl alcohol, ethyl alcohol, propyl alcohol, isopropyl alcohol, ethyl acetate, and mixtures thereof.

46. The method of claim 42, wherein the wetting promoter contains about 30% by weight of methyl alcohol and about 70% by weight of isopropyl alcohol.

47. The method of claim 42, wherein the wetting promoter contains about 70% by weight to about 95% by weight of an alcohol component and about 5% by weight to about 30% by weight of ethyl acetate.

48. The method of claim 47, wherein the alcohol component is selected from the group consisting of methyl alcohol, ethyl alcohol, propyl alcohol, isopropyl alcohol, and mixtures thereof.

49. The method of claim 42, wherein the wetting promoter contains about 85% by weight of isopropyl alcohol and about 15% by weight of ethyl acetate.

50. The method of claim 42, wherein the wetting promoter contains an acrylate-based adhesive.

51. The method of claim 42, wherein the wetting promoter contains an acrylate monomer/oligomer.

52. The method of claim 42, wherein the adhesive layer has a thickness in a range from about 40 $\mu$m to about 70 $\mu$m.

53. The method of claim 43, wherein the adhesive layer has a thickness in a range from about 40 $\mu$m to about 70 $\mu$m.

54. The method of claim 42, wherein the reflective layer is comprised of aluminum.

55. The method of claim 54, wherein the semireflective layer is comprised of a material selected from the group consisting of gold, silicon, and silicon derivatives.

* * * * *